(12) United States Patent
Ge

(10) Patent No.: US 10,036,460 B2
(45) Date of Patent: Jul. 31, 2018

(54) POWERTRAIN SYSTEM WITH VARIATOR SPEED BALANCING

(71) Applicant: Caterpillar Inc., Peoria, IL (US)

(72) Inventor: Xinyu Ge, Peoria (IL)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/375,340

(22) Filed: Dec. 12, 2016

(65) Prior Publication Data

US 2018/0163838 A1 Jun. 14, 2018

(51) Int. Cl.
*F16H 47/04* (2006.01)
*F16H 61/4035* (2010.01)
*F16H 61/4148* (2010.01)

(52) U.S. Cl.
CPC ......... *F16H 47/04* (2013.01); *F16H 61/4035* (2013.01); *F16H 61/4148* (2013.01); *F16H 2047/045* (2013.01)

(58) Field of Classification Search
CPC .. F16H 47/04; F16H 61/4035; F16H 61/4148; F16H 2047/045
See application file for complete search history.

(56) References Cited

U.S. PATENT DOCUMENTS

| | | | |
|---|---|---|---|
| 6,170,587 B1 * | 1/2001 | Bullock | B60K 6/105 180/165 |
| 8,302,720 B2 * | 11/2012 | Rose | B60K 6/12 180/167 |
| 8,342,995 B2 | 1/2013 | Grant | |
| 8,494,730 B2 * | 7/2013 | Yoshikawa | B60K 6/48 701/51 |
| 8,500,587 B2 | 8/2013 | Du et al. | |
| 8,827,853 B2 | 9/2014 | Carl et al. | |
| 8,840,524 B2 * | 9/2014 | Arsenault | B60W 10/06 |
| 9,266,420 B2 * | 2/2016 | Edward | B60K 7/0015 |
| 2016/0114668 A1 | 4/2016 | Zhang et al. | |
| 2017/0158187 A1 * | 6/2017 | Calvert | B60W 20/10 |
| 2017/0167513 A1 * | 6/2017 | McDonald | F15B 11/16 |

FOREIGN PATENT DOCUMENTS

| | | |
|---|---|---|
| DE | 102013204220 | 9/2014 |
| JP | 2009097646 | 5/2009 |

* cited by examiner

*Primary Examiner* — Jacob S. Scott
*Assistant Examiner* — Tinh Dang
(74) *Attorney, Agent, or Firm* — Mattingly Burke Cohen & Biederman

(57) ABSTRACT

A powertrain system for a machine includes a hydraulic variator assembly coupled with a mechanical transmission, and a speed balancing system including a hydraulic accumulator, and being configured to limit a speed balancing error between first and second variators in the variator assembly by commanding adjustment of a valve mechanism to fluidly connect a hydraulic accumulator with one of the variators to increase a fluid flow rate therethrough. The hydraulic accumulator can be charged by way of an implement system in a machine driven by way of the powertrain system.

20 Claims, 4 Drawing Sheets

POWERTRAIN SYSTEM WITH VARIATOR SPEED BALANCING

TECHNICAL FIELD

The present disclosure relates generally to a machine powertrain system, and more particularly to balancing speeds of hydraulic variators coupled with a mechanical transmission in a powertrain system.

BACKGROUND

Machine powertrain systems are built in the modern age according to many different architectures. The powertrain system is generally understood as those components in a machine that produce rotational power and transmit it to ground-engaging propulsion elements, or a final drive coupled with the ground-engaging propulsion elements. A transmission coupled between an engine and the final drive is a core component of a machine powertrain. Mechanical transmissions in the nature of automatic transmissions having two, three, four or many more gear ratios are widely used. Manual transmissions remain in common usage at least for certain applications. As an alternative to, or sometimes in addition to mechanical gear sets, modern transmissions in off-highway or other utility machines are often hydraulic, or more particularly hydrostatic. In a hydrostatic transmission or "hystat" a hydraulic pump is provided and operates in conjunction with a hydraulic motor to provide a generally continuous range of transmission ratios produced by varying a displacement of the pump.

Still another increasingly popular powertrain system architecture is a so-called hybrid transmission that utilizes a combined hystat and mechanical design, where a hydrostatic transmission, referred to in this context as a variator, is coupled with components of a mechanical transmission. One or more variators, which can be driven from the engine geartrain or by way of some other technique, provide assistive torque to the transmission and can generally vary their input speed to the transmission across a relatively wide range. This enables the transmission to be operated by both a direct mechanical input from the engine and also an indirect mechanical input from the variators, enabling engine speed to be maintained relatively constant while varying the input speed provided to the transmission. A great many different variations on this general hybrid or split-path design have been proposed over the years. Despite many advances, there remains ample room for improvement, especially where multiple variators are used cooperatively, as even relatively minor mismatches in the variator characteristics or operation can end up reducing efficiency in the operation of the transmission. Commonly owned U.S. Pat. No. 8,500,587 to Hongliu et al. is directed to a system for providing hydraulic power in a transmission with multiple variators. A common input is geared to the inputs of the variators and a common output is geared to the outputs of the variators, tying the pump and motor of each variator to rotate at the same speed as the counterpart components of the other variator.

SUMMARY OF THE INVENTION

In one aspect, a powertrain system for a machine includes a mechanical transmission including a planetary gear set coupled between an input shaft and an output shaft, and a hydraulic variator assembly including a first variator and a second variator, and transmission input gearing coupling the first variator and the second variator with the planetary gear set. Each of the first variator and the second variator include a respective pump and motor and operate at a speed that is dependent upon a rate of flow of hydraulic fluid between the respective pump and motor. The powertrain system further includes a speed balancing system for the hydraulic variator assembly including a hydraulic accumulator, an electronically controlled valve mechanism fluidly between the hydraulic accumulator and each of the first variator and the second variator, and a control mechanism. The electronically controlled valve mechanism is in a first state where the hydraulic accumulator is blocked from fluid communication with either of the first variator or the second variator, and is adjustable to a second state at which the valve mechanism fluidly connects the hydraulic accumulator to the second variator but not to the first variator. The control mechanism is configured to limit a speed balancing error between the first variator and the second variator at least in part by commanding adjustment of the valve mechanism to the second state, such that a speed of the second variator is adjusted according to a flow of hydraulic fluid between the second variator and the hydraulic accumulator that varies the rate of flow between the respective pump and motor.

In another aspect, a method of operating a powertrain system in a machine includes conveying hydraulic fluid between a pump and a motor in each of a first variator and a second variator in a hydraulic variator assembly coupled with a mechanical transmission. The method further includes transferring torque from the motor in each of the first variator and the second variator to a planetary gear set in the mechanical transmission, and transferring torque between the motor in the first variator and the motor in the second variator. The method further includes establishing a flow of hydraulic fluid between the second variator and a hydraulic accumulator such that a rate of flow of the hydraulic fluid between the pump and the motor in the second variator is varied. The method further includes reducing a speed difference between the first variator and the second variator by way of varying of the rate of flow, such that the transferring of the torque between the motor in the first variator and the motor in the second variator is limited.

In still another aspect, a control system for balancing speeds of a first variator and a second variator in a hydraulic variator assembly coupled with a planetary gear set in a mechanical transmission of a powertrain system is provided, including an electrical actuator configured to couple with a valve mechanism positioned fluidly between a hydraulic accumulator and each of the first variator and the second variator in the hydraulic variator assembly. The control system further includes a control mechanism coupled with the electrical actuator, and being configured to vary an electrical energy state of the electrical actuator to adjust the valve mechanism between a first state where the hydraulic accumulator is blocked from fluid communication with either of the first variator or the second variator, and a second state at which the valve mechanism fluidly connects the hydraulic accumulator to the second variator but not the first variator. The control mechanism is also configured to limit a speed balancing error between the first variator and the second variator at least in part by commanding the adjustment of the valve mechanism to the second state to produce a flow of hydraulic fluid between the second variator and the hydraulic accumulator that varies a rate of flow between a pump and a motor in the second variator and adjusts a speed of the second variator.

DETAILED DESCRIPTION

Figure 1:
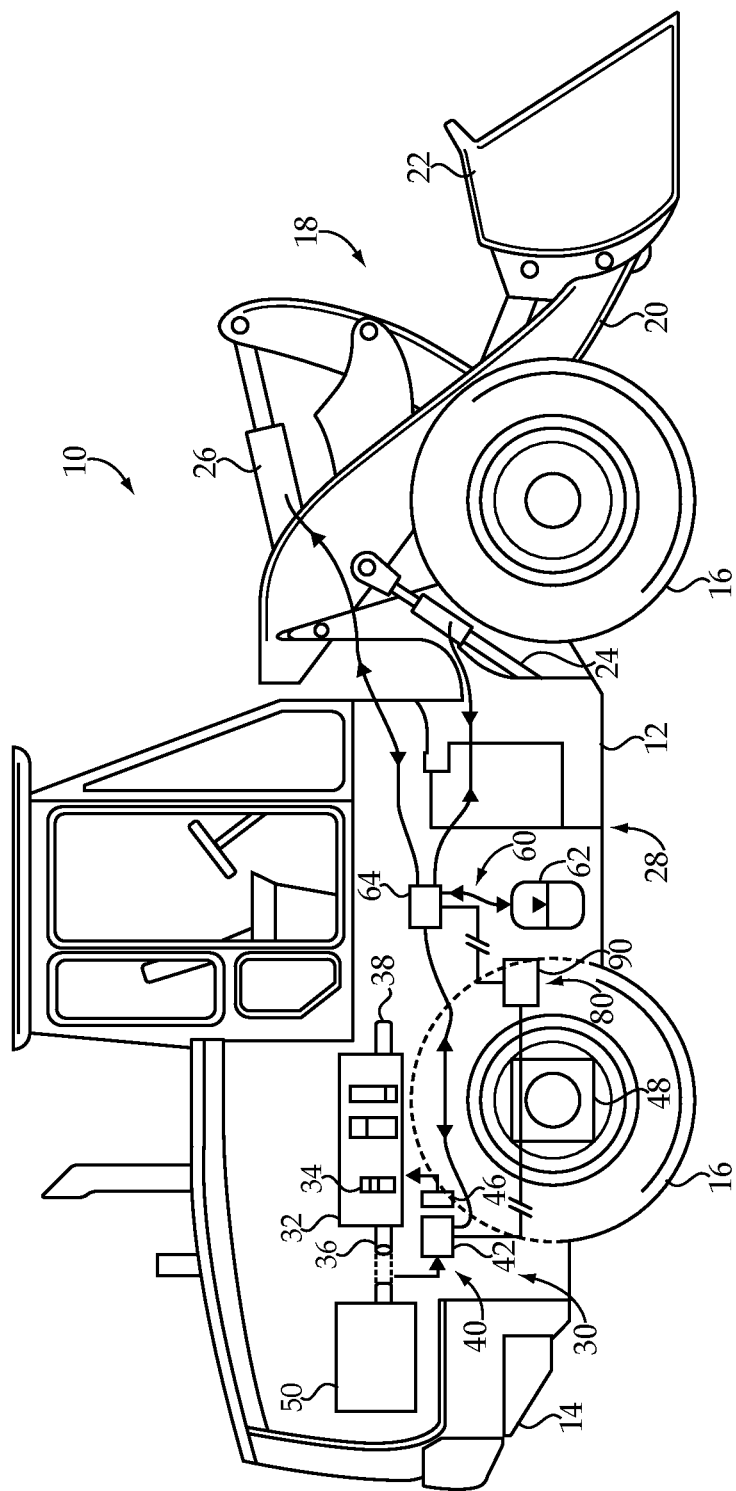
FIG. 1 is a side diagrammatic view of a machine having a powertrain system, according to an embodiment.

Referring to FIG. 1, there is shown a machine 10 according to one embodiment, and illustrated in the context of an articulated wheel loader having a front frame unit 12 coupled to a back frame unit 14 at an articulation joint 28. Front ground-engaging elements 16 and back ground-engaging elements in the nature of ground-engaging wheels are shown coupled to front frame unit 12 and back frame unit 14, respectively. Machine 10 includes a hydraulic implement system 18 including a lift arm or boom 20 coupled with an implement in the nature of a bucket. A hydraulic lift actuator 24 lifts lift arm 20 up and down whereas a hydraulic tilt actuator 26 tilts implement 22 between a racked position and a dump position. It should be appreciated that an articulated wheel loader is but one example among many examples of machines that can be configured according to the teachings set forth herein. Other mobile off-highway machines such as excavators, tracked vehicles such as track-type tractors, wheel tractors, backhoes, front shovels, trucks, scrapers and numerous other machines are contemplated within the context of the present disclosure. Machine 10 is equipped with a powertrain system 30 that is uniquely configured to cooperate with implement system 18 for energy recovery and operating efficiency, as will be further apparent from the following description.

In a practical implementation strategy, powertrain system 30 includes an internal combustion engine 50, such as a compression ignition diesel engine, coupled with a mechanical transmission 32, configured to couple with a final drive 48 including well-known components. Internal combustion engine 50 is configured to produce rotational power for operating back ground-engaging elements 16, and depending upon the machine application potentially also front ground-engaging elements 16. Mechanical transmission 32 (hereinafter "transmission 32") includes one or more planetary gear sets 34 coupled between an input shaft 36 and an output shaft 38. Input shaft 36 receives a torque input from internal combustion engine 50, typically by way of a gear train and torque converter (not shown in FIG. 1). Planetary gear set 34, as well as potentially a plurality of different forward gears and at least one reverse gear, transfer the torque to output shaft 38, which in turn operates final drive 48. Powertrain system 30 further includes a hydraulic variator assembly 40 (hereinafter "variator assembly 40") having a first variator 42, and a second variator not visible in FIG. 1. Variator assembly 40 further includes transmission input gearing 46 coupling first variator 42 and the second variator with planetary gear set 34. Powertrain system 30 also includes a speed balancing system 60 for variator assembly 40, including a control system 80 and various other components, the structure and functionality of which are further discussed below.

Figure 2:
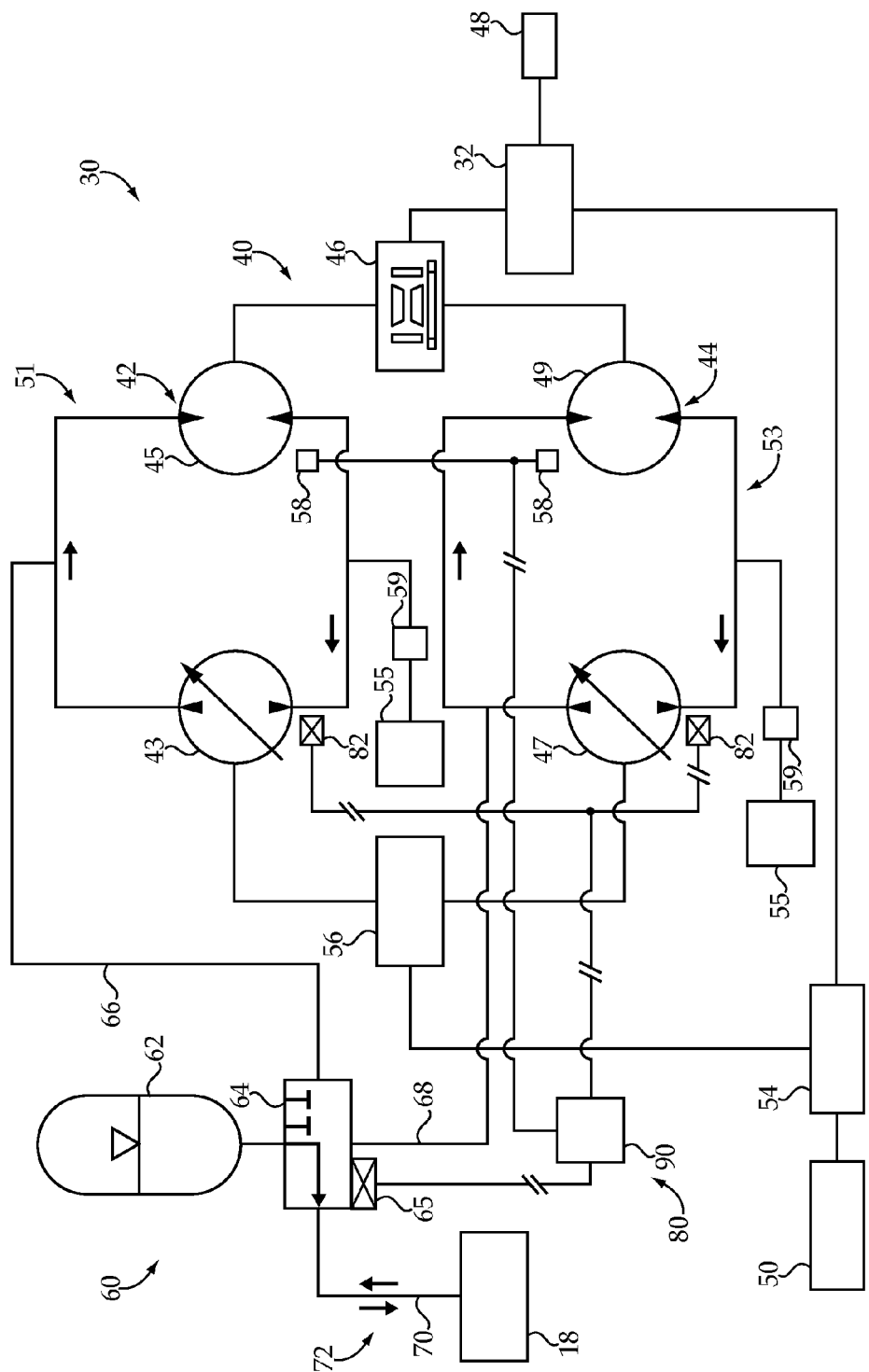
FIG. 2 is a schematic view of a powertrain system in a first configuration, according to an embodiment.

Referring now to FIG. 2, there is shown powertrain system 30 in greater detail. Each of first variator 42 and second variator 44 includes a pump 43, 47, respectively, and a motor 45, 49, respectively, that are together configured to apply assistive torque to mechanical transmission 32 by way of transmission input gearing 46. Internal combustion engine 50 is shown coupled with gearing or a gear train 54 that provides for splitting a torque output of internal combustion engine 50 between mechanical transmission 32 and a second set of gearing or gearbox 56 that operates pump 43 and pump 47 in a generally conventional manner. First variator 42 includes hydraulic circuitry 51 for conveying hydraulic fluid between pump 43 and motor 45, whereas second variator 44 includes hydraulic circuitry 53 for conveying hydraulic fluid between pump 47 and motor 45. First variator 42 and second 44 operate each at a speed that is dependent upon a rate of flow of hydraulic fluid between the corresponding pump 43, 47 and motor 45, 49. In the illustrated embodiment, transmission input gearing 46 includes a differential coupled between motor 45 and motor 49. A hydraulic tank 55 is shown, illustrated twice in FIG. 2 for clarity, and is fluidly connected with hydraulic circuitry 51 and hydraulic circuitry 53 by way of one or more control valves 59.

During operation, variator assembly 40 first variator 42 and second variator 44 can receive fluid from tank 55 and convey fluid to tank 55 subject to position or operation of control valve(s) 59 in a generally conventional manner. Those skilled in the art will be familiar with the general desirability of operating first variator 42 and second variator 44 at speeds as close to desired or prescribed speeds as is practicable. The desired or prescribed speeds will typically be the same. It has been observed that where variator motors operate at different speeds and the variator motors are configured to be directly or indirectly in tight mesh with one another, torque can be transmitted between the two or more variators. This transfer of torque, while probably impossible to eliminate completely, is generally undesired as it results in one variator driving the other variator instead of the torque that would otherwise be available being transmitted to the associated mechanical transmission. Implementation of differential gearing in transmission input gearing 46 can allow motor 45 and motor 49 to differentiate relative to one another. As will be further apparent from the following description, additional construction and control strategies set forth herein enable further refinement and limiting of any torque transfer between motor 45 and motor 49 that might still occur.

To this end, powertrain system 30 further includes a speed balancing system 60 for variator assembly 40 having a hydraulic accumulator 62, an electronically controlled valve mechanism 64 fluidly between hydraulic accumulator 62 and each of first variator 42 and second variator 44, and a control system 80 that includes a control mechanism 90. In some implementations, control mechanism 90 may include one or more programmable computers. During operation of powertrain system 30, or where powertrain system 30 is at rest, valve mechanism 64 may be in a first state where hydraulic accumulator 62 is blocked from fluid communication with either of first variator 42 or second variator 44. Valve mechanism 64 is adjustable to a second state at which valve mechanism 64 fluidly connects hydraulic accumulator 62 to second variator 44 but not to first variator 42. In FIG. 2 it can be seen that a first hydraulic line 66 extends between valve mechanism 64 and hydraulic circuitry 51, to provide a fluid connection with hydraulic circuitry 51 at a location fluidly between pump 43 and motor 45. It can also be seen that a second hydraulic line 68 extends between valve mechanism 64 and hydraulic circuitry 53 to fluidly connect hydraulic accumulator 62 with hydraulic circuitry 53 at a location fluidly between pump 47 and motor 44. An electrical actuator 65 is associated with valve mechanism 64, and control mechanism 90 is in control communication with electrical actuator 65 to move valve mechanism 64 between the first state and the second state, and/or to other states by controlling or varying an electrical energy state of electrical actuator 65. In the first state, valve mechanism 64 may fluidly connect hydraulic accumulator 62 with implement system 18, more particularly with one of hydraulic implement actuators 24 or 26.

Those skilled in the art will further appreciate the potential for charging of accumulator 62 with fluid pressure produced by implement system 18, such as during lowering lift arm 20 or lowering or otherwise adjusting bucket 22. Rather than storing pressurized fluid for return to implement system 18, or solely for the purpose of returning to implement system 18, valve mechanism 64 is configured to also provide energy storage and/or energy return capabilities between powertrain system 30 and implement system 18. Valve mechanism 64 can also be adjusted to a third state at which valve mechanism 64 fluidly connects hydraulic accumulator 62 with first variator 42 but not with second variator 44. For purposes of understanding the present disclosure, it should be appreciated that the terms "first," "second," etc. are not used herein in a limiting sense. Put differently, the designation of which variator is the "first" variator and which variator is the "second" variator is arbitrary depending on perspective and context.

Each of pump 43 and pump 47 may have a variable displacement, and in FIG. 2, electronically controlled displacement actuators 82 are shown coupled with each of pump 43 and pump 47, and may be controlled by control mechanism 90. Pumps 43 and 47 can be variable displacement swash plate pumps in one embodiment. As further discussed below, control system 80 may utilize closed loop control over pump displacement and swash plate position to control a rate of flow of hydraulic fluid conveyed between pumps 43, 47 and motors 45, 49 for purposes of variator speed control. The present disclosure, however, provides for additional variator speed control and speed balancing that can run in parallel with the closed loop control, exploiting additional energy stored in hydraulic accumulator 62 to adjust variator speed and potentially in an open loop fashion.

To this end, control mechanism 90 may be configured to limit a speed balancing error between first variator 42 and second variator 44 at least in part by commanding adjustment of valve mechanism 64 from the first state to the second state such that a speed of second variator 44 is adjusted according to a flow of hydraulic fluid between second variator 44 and hydraulic accumulator 62 that varies the rate of flow between the corresponding pump 47 and motor 49. It will be recalled that a speed of each of first variator 42 and second variator 44 is dependent upon a rate of flow of hydraulic fluid between the corresponding pump 43, 47 and motor 45, 49. Hydraulic fluid may be conveyed from hydraulic accumulator 62 to second variator 44 to increase the rate of flow of hydraulic fluid, and provide a boost in the rate of flow to increase speed of second variator 44 to more closely match speed of first variator 42, and thereby reduce the speed balancing error.

In a practical implementation strategy, control mechanism 90 may be configured to receive data indicative of a difference in speeds of motor 45 in first variator 42 and motor 49 in second variator 44 that defines the speed balancing error. An example speed balancing error might be 0.15 revolutions per minute, 0.25 revolutions per minute, or some other numerical quantity. To this end, powertrain system 30 may include a speed sensor 58 coupled with each of motor 45 and motor 49. Still other manners of deducing speed or differences in speed between first variator 42 and second variator 44 are contemplated within the context of the present disclosure. In FIG. 2, powertrain system 30 is shown in a first configuration, where valve mechanism 64 is in the first state such that hydraulic fluid can be conveyed between hydraulic accumulator 62 and implement system 18. Flow arrows 72 designate approximate directions of possible flow through a third hydraulic line 70. As noted above, valve mechanism 64 may include an electrical actuator 65, or potentially in other embodiments multiple electrical actuators. For that matter, valve mechanism 64 could include two, three, or four or more valves all configured to control a different one of the various hydraulic connections between and among components of implement system 18 and powertrain system 30.

Figure 3:
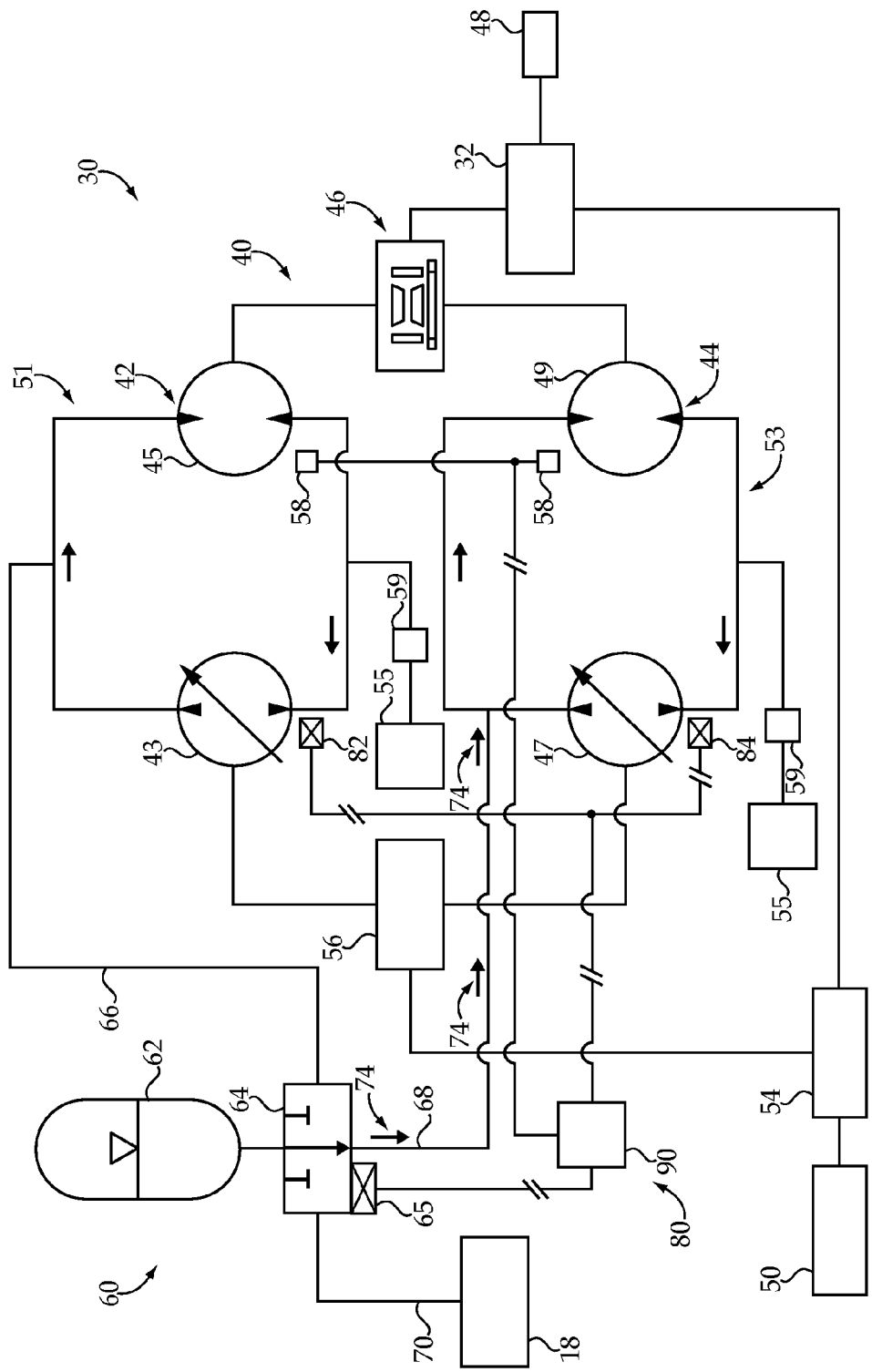
FIG. 3 is a schematic view of a powertrain system in a second configuration, according to an embodiment.

Referring to FIG. 3, there is shown a similar depiction of powertrain system 30 but this time showing arrows 74 representing a possible flow of hydraulic fluid through hydraulic line 68 to circuitry 53. Those skilled in the art will readily contemplate another representation where valve mechanism 64 is in yet another state and flow of hydraulic fluid passes through hydraulic line 66 from hydraulic accumulator 62 to hydraulic circuitry 51. In still other instances, first variator 42 and second variator 44 could feed hydraulic fluid back through either or both of hydraulic lines 66 and 68 in reverse directions of flow from those depicted, to charge accumulator 62. Control mechanism 90 all the while may change an electrical energy state of electrical actuator 65 to position valve mechanism 90 as desired, energizing electrical actuator 65 or partially or fully de-energizing electrical actuator 65 to adjust valve mechanism 64 among the various different states.

INDUSTRIAL APPLICABILITY

Figure 4:
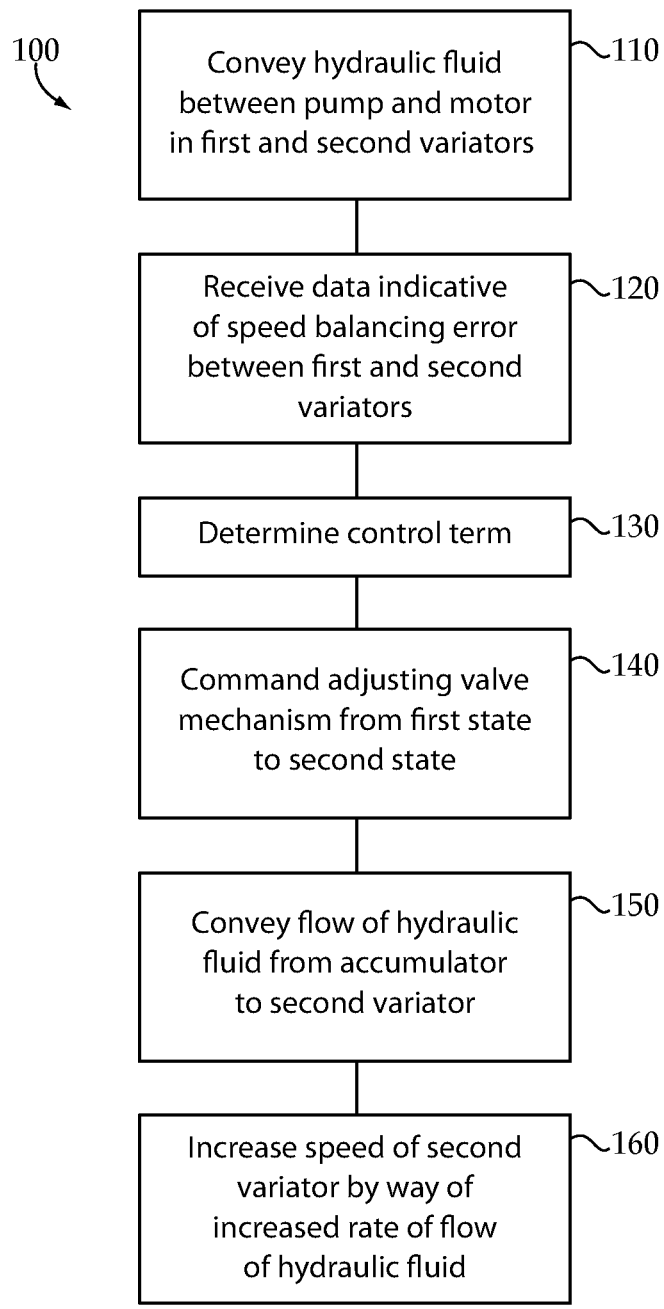
FIG. 4 is a flowchart illustrating example control logic flow and operating methodology, according to an embodiment.

Referring to the drawings generally, but also now to FIG. 4, there is shown a flowchart 100 illustrating example methodology and control logic flow relating to operating powertrain system 30 and machine 10. During operation of powertrain system 30 internal combustion engine 50 can be operating to apply torque to input shaft 36 of transmission 32. A torque output of internal combustion engine 50 can be split between mechanical transmission 32 and variator assembly 40, with gearing 56 providing torque to pump 43 and also to pump 47. Pumps 43 and 47 in turn operate to convey hydraulic fluid through hydraulic circuitry 51 and hydraulic circuitry 53, respectively, to operate motor 45 and motor 49. Torque from motor 45 is blended with torque from motor 49 at transmission input gearing 46, and cases where torque is being transferred between motor 45 and motor 49 which can occur occasionally. As discussed above, the present disclosure contemplates apparatus and methodology whereby torque transfer between motor 45 and motor 49 is limited, and at least in some instances eliminated.

When a speed of first variator 42 and second variator 44 is desired to be adjusted, control mechanism 90 can output control commands to displacement actuators 82. In a practical implementation strategy, control mechanism 90 can control a displacement of pump 43 and a displacement of pump 47 in a closed loop fashion, being configured to determine and re-determine a closed loop control term indicative of errors in position of pump displacement actuator 82 in pump 43 and pump displacement actuator 82 in pump 47. Control mechanism 90 can further successively command adjustments to the position of the corresponding pump displacement actuator 82 in one or both of pump 43 and pump 47 based on the determined and re-determined closed loop control term, at each adjustment or commanded adjustment reducing the position error. As discussed above hardware variations and instability or fluctuations in hydraulic pressures, or still other factors, can prevent variators 42 and 44 from operating at precisely the same speed, particularly when being adjusted in speed such as during transients, or shortly after a commanded adjustment in speed. It can be during the speed adjustment or shortly following a commanded speed adjustment that a speed balancing error between first variator 42 and second variator 44 is desirably limited to prevent transfer of torque between motor 45 and motor 49 and the resulting waste of energy and drop in transmission efficiency.

In flowchart 100, at block 110 hydraulic fluid is conveyed between pump 43, 47, and motor 45, 49 in first variator 42 and second variator 44. From block 110, the process may advance to block 120 where control mechanism 90 receives data indicative of a speed balancing error between first variator 42 and second variator 44. From block 120, the process may advance to block 130 where control mechanism 90 determines a control term, such as an open loop control term that is used to adjust valve mechanism 64. The open loop control term could include a numerical term such as a multiplier that is calculated based on the speed balancing error, indicated by data from speed sensors 58, or determined in another way. Control mechanism 90 might also look up the open loop control term from a lookup table or the like. The open loop control term could further be a control term that determines a time that valve mechanism 64 is in a state fluidly connecting hydraulic accumulator 62 with second variator 44. Another way to understand this control feature is that control mechanism 90 turns on fluid communication between hydraulic accumulator 62 and second variator 44 to boost the flow of hydraulic fluid through circuitry 53. Values of the open loop control term for different scenarios could be determined empirically, for example. From block 130, the process may advance to block 140 to command adjusting valve mechanism 64 from the first state to the second state, as described herein. From block 140, the process may advance to block 150 to convey a flow of hydraulic fluid from hydraulic accumulator 62 to second variator 44. From block 150 the process may advance to block 160 to increase the speed of second variator 44, in particular the speed of motor 49 by way of increased rate of flow of hydraulic fluid.

It will be appreciated that the closed loop control over pump displacement and the open loop control over hydraulic connections between hydraulic accumulator 62 and one of variator 42 or variator 44 can take place in parallel. The present control strategy can therefore be thought of as superimposing open loop control on closed loop control. It will also be appreciated that the present disclosure contemplates sharing energy storage between implement system 18 and powertrain system 30, such that hydraulic accumulator 62 can be discharged and/or charged from either side of the system. Thus, as discussed herein, when one of hydraulic actuators 24 or 26 is moving under the force of gravity, pressurized fluid can be stored in hydraulic accumulator 62, and when one or both of hydraulic actuators 24 or 26 is moving in opposition to a force of gravity the stored energy can be returned. Likewise, energy stored in hydraulic accumulator 62 from implement system 18 can be provided to powertrain system 30, and instances where a reduction in flow rate of hydraulic fluid through circuitry 51 or 53 is desired can be exploited to return energy to hydraulic accumulator 62 for charging.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A powertrain system for a machine comprising:
   a mechanical transmission including a planetary gear set coupled between an input shaft and an output shaft;
   a hydraulic variator assembly including a first variator and a second variator, and transmission input gearing coupling the first variator and the second variator with the planetary gear set, and each of the first variator and the second variator including a respective pump and motor and operating at a speed that is dependent upon a rate of flow of hydraulic fluid between the respective pump and motor; and
   a speed balancing system for the hydraulic variator assembly including a hydraulic accumulator, an electronically controlled valve mechanism fluidly connected between the hydraulic accumulator and each of the first variator and the second variator, and a control mechanism;
   the electronically controlled valve mechanism being in a first state where the hydraulic accumulator is blocked from fluid communication with either of the first variator or the second variator, and adjustable to a second state at which the valve mechanism fluidly connects the hydraulic accumulator to the second variator but not the first variator; and
   the control mechanism being configured to limit a speed balancing error between the first variator and the second variator at least in part by commanding adjustment of the valve mechanism to the second state, such that a speed of the second variator is adjusted according to a flow of hydraulic fluid between the second variator and the hydraulic accumulator that varies the rate of flow between the corresponding pump and motor.

2. The system of claim 1 wherein the control mechanism is further configured to receive data indicative of a difference, in speeds of the motor in the first variator and the motor in the second variator, that defines the speed balancing error, and to command the adjustment to the valve mechanism based on the speed balancing error such that a flow of fluid, from the hydraulic accumulator to the motor in the second variator, increases the speed of the motor in the second variator.

3. The system of claim 2 wherein the transmission input gearing includes a differential coupled between the motor in the first variator and the motor in the second variator.

4. The system of claim 2 wherein each of the first variator and the second variator includes hydraulic circuitry fluidly connecting the corresponding pump and motor, and wherein the speed balancing system includes a first hydraulic line fluidly connecting to the hydraulic circuitry of the first variator at a location fluidly between the corresponding pump and motor, and a second hydraulic line fluidly connecting to the hydraulic circuitry of the second variator at a location fluidly between the corresponding pump and motor.

5. The system of claim 4 wherein the valve mechanism includes a third state where the valve mechanism fluidly connects the hydraulic accumulator to the first variator by way of the first hydraulic line.

6. The system of claim 4 further comprising a hydraulic implement actuator fluidly connected to the hydraulic accumulator, and wherein the valve mechanism fluidly connects the hydraulic implement actuator with the hydraulic accumulator in the first state.

7. The system of claim 1 wherein each of the first variator and the second variator has a variable displacement and includes a pump displacement actuator.

8. The system of claim 7 wherein the control mechanism is further configured to determine and re-determine a closed loop control term indicative of an error in a position of the pump displacement actuator in the second variator, and to successively command adjustments to the position of the pump displacement actuator based on the determined and re-determined closed loop control term.

9. The system of claim 8 wherein the control mechanism is further configured to determine an open loop control term based on the speed balancing error, and to command the adjustment of the valve mechanism based on the determined open loop control term.

10. A method of operating a powertrain system in a machine, the method comprising:
conveying hydraulic fluid between a pump and a motor in each of a first variator and a second variator in a hydraulic variator assembly coupled with a mechanical transmission;
transferring torque from the motor in each of the first variator and the second variator to a planetary gear set in the mechanical transmission;
transferring torque between the motor in the first variator and the motor in the second variator;
establishing a flow of hydraulic fluid between the second variator and a hydraulic accumulator such that a rate of flow of the hydraulic fluid between the pump and the motor in the second variator is varied;
reducing a speed difference between the first variator and the second variator by way of varying of the rate of flow, such that the transferring of the torque between the motor in the first variator and the motor in the second variator is limited.

11. The method of claim 10 further comprising charging the hydraulic accumulator from a hydraulic implement actuator in an implement system of the machine.

12. The method of claim 10 further comprising determining a control term indicative of an error in a position of a displacement actuator in the pump of the second variator, and commanding adjusting the position of the displacement actuator based on the control term.

13. The method of claim 10 further comprising determining a control term based on the speed difference, and commanding adjusting a valve mechanism positioned fluidly between the hydraulic accumulator and the second variator according to the control term so as to establish the flow of hydraulic fluid.

14. The method of claim 10 wherein the transferring of the torque from the motor in each of the first variator and the second variator to the planetary gear set includes transferring the torque by way of a differential.

15. The method of claim 10 wherein the establishing of the flow of hydraulic fluid includes establishing a flow of hydraulic fluid from the hydraulic accumulator to hydraulic circuitry fluidly connecting the pump and the motor of the second variator.

16. The method of claim 15 wherein the reducing of the speed difference includes reducing the speed difference by way of increasing a speed of the second variator.

17. A control system for balancing speeds of a first variator and a second variator in a hydraulic variator assembly coupled with a planetary gear set in a mechanical transmission of a powertrain system, the control system comprising:
an electrical actuator configured to couple with a valve mechanism positionable fluidly between a hydraulic accumulator and each of the first variator and the second variator in the hydraulic variator system;
a control mechanism coupled with the electrical actuator, and being configured to vary an electrical energy state of the electrical actuator to adjust the valve mechanism between a first state where the hydraulic accumulator is blocked from fluid communication with either of the first variator or the second variator, and a second state at which the valve mechanism fluidly connects the hydraulic accumulator to the second variator but not the first variator; and
the control mechanism being configured to limit a speed balancing error between the first variator and the second variator at least in part by commanding the adjustment of the valve mechanism to the second state to produce a flow of hydraulic fluid between the second variator and the hydraulic accumulator that varies a rate of flow between a pump and a motor in the second variator and adjusts a speed of the second variator.

18. The control system of claim 17 wherein the control mechanism is further configured to determine a first control term indicative of an error in a position of a displacement actuator in the pump of the second variator, and to determine a second control term indicative of the speed balancing error.

19. The control system of claim 18 wherein the first control term includes a closed loop control term and the control mechanism is further configured to adjust the position of the displacement actuator based on the closed loop control term.

20. The control system of claim 19 wherein the second control term includes an open loop control term, and the control mechanism is further configured to adjust the valve mechanism from the first state to the second state during the adjustment of the position of the displacement actuator.

* * * * *